United States Patent Office 3,725,039
Patented Apr. 3, 1973

3,725,039
RECOVERY OF NICKEL CONCENTRATES FROM LATERITE ORES
Tage L. B. Jepsen, Gabbs, Nev., assignor to Basic Incorporated, Cleveland, Ohio
No Drawing. Filed Dec. 10, 1970, Ser. No. 96,951
Int. Cl. C22b 1/08
U.S. Cl. 75—2                                    11 Claims

ABSTRACT OF THE DISCLOSURE

A process is disclosed for the recovery of nickel concentrates from laterite ores by segregation roasting wherein the ore after drying for removal of at least part of the free water is mixed with a chloridizing agent and a carbonaceous reductant, such as coal or coke, before roasting. This mixture is heated to temperatures of 900° to 1050° C. while maintaining a slightly reducing atmosphere. Preferred chloridizing agent is a mixture of sodium chloride and calcium oxide. The resulting sinter is subjected to suitable concentration for final nickel recovery.

---

This invention relates to the recovery of nickel concentrates from laterite ores by segregated roasting.

In general, the prior art known to applicant indicates that segregation roast treatments may be used on nickel as well as copper ores. It is recognized that the type of chloridizing agent employed affects the recovery of nickel and calcium chloride is recognized as the most effective chloridizing agent. While sodium chloride or mixtures of calcium chloride and sodium chloride have been used as chloridizing agents, they have not been found as effective as calcium chloride alone. Lime addition has been tried in copper ore treatments and the conclusion reached is that lime has a detrimental effect.

Nickeliferous laterite ores, although of relatively low grade with respect to the nickel content are amenable to treatment by my process, and an upgraded product is obtained with recoveries at a sufficiently high percentage to make the process economical. The ores suitable for treatment by this process are lateritic ores, such as high-iron laterites, saprolites, decomposed ultra-basic rocks and their serpentized derivatives, and the so-called garnierites or nickel-enriched serpentines. The laterite ores of Guatemala, Brazil, Cuba and New Caledonia are of particular interest because previously known chloridizing agents which are both low cost and efficient have not been available for treatment of such ores in proximity to the location where they are mined. Importation of such reagents into such mining areas from distant supply sources adds so much to their cost that the subsequent treatment usually is not economical.

One of the innovations of the present invention is the discovery that a mixture of sodium chloride and calcium oxide provides an efficient and economical chloridizing agent for segregated roasting treatments of laterite ores, even in remote processing areas, such as locations adjoining the mining locations in Guatemala, Brazil, Cuba and New Caledonia where such ores are mined. The advantage of using the mixture at such a location is that it is cheaper than calcium chloride and performs equally well. It also performs better with laterite ores than either sodium chloride alone or a sodium chloride-calcium chloride mixture.

Accordingly, it is an object of my invention to provide a simple, economical and efficient segregation roasting process for laterite ores.

Another object of my invention is to provide a low cost and efficient chloridizing agent for use in segregated roasting treatments of nickeliferous laterite ores.

A further object of my invention is to provide a segregated roasting treatment followed by magnetic separation to obtain a relatively high recovery of an upgraded nickel concentrate of laterite ores on an economic basis.

The present process was developed by a series of investigations as part of a program using three different samples of partially dried Guatemalan laterite ore. The tests consisted of roasting followed by cooling in a non-oxidizing atmosphere. The cooled roasted samples were wet ground to liberate the nickel-cobalt metal values from the sintered gangue. The slurry of ground sinter was then treated by wet magnetic separation to obtain a nickel-cobalt concentrate. In some of the tests, the grinding was carried out in water containing about 1.5% $Na_2S$, though it is probably not necessary for sodium sulfide to be used with all types of sinters. Optimization tests to compare the relative merits of calcium chloride-coke and sodium chloride-coke blends showed that the former gave better results than the latter at the temperature and at the residence time that were tried. I determined that a sodium chloride-lime mixture could be substituted for calcium chloride. Calcination of the ore prior to roasting did not seem to improve recovery. Combining a more reactive reductant with a less reactive reductant gave results of no particular advantage. The head analysis of the ore had a definite effect on the grade and recovery.

In these investigations, the amenability of the laterite sample to my segregation roast and concentration process was established. A concentrate analyzing 25.49% nickel was obtained at 84.78% nickel recovery from crude ore containing 2.08% nickel, when mixed with a 4% petroleum coke and 10% calcium chloride and roasted at 950° C. and cooled in a non-oxidizing atmosphere. The three samples of Guatemalan laterites tested have been designated A, B and C. They were partially dried and ground through rolls to minus 35 mesh. Chemical analyses of the three samples follow:

| Constituents, percent: | A | B | C |
|---|---|---|---|
| Nickel, Ni | 2.08 | 1.55 | 0.97 |
| Cobalt, Co | 0.030 | 0.032 | 0.081 |
| Ferric oxide, $Fe_2O_3$ | 24.18 | 24.04 | 26.51 |
| Silica, $SiO_2$ | 42.60 | 38.56 | 49.32 |
| Alumina, $Al_2O_3$ | 1.52 | 5.31 | 4.76 |
| Magnesia, MgO | 13.82 | 15.07 | 8.15 |
| Lime, CaO | 0.31 | 0.27 | 0.24 |

Three different mixtures of sodium chloride and calcium oxide were tested as chloridizing agents. In each mixture an amount of sodium chloride was used which would be equivalent to 10% calcium chloride in the charge. The best grade and recovery were obtained when a sodium chloride-calcium oxide ratio of 2:1 was used as shown in the following table:

RESULTS WITH DIFFERENT SODIUM CHLORIDE-CALCIUM OXIDE MIXTURES
(Reductant: 4% Petroleum Coke)

| Test No. | Sodium chloride-calcium oxide ratio | | Percent wt. | Percent Ni | Percent Ni dist |
|---|---|---|---|---|---|
| A-1 | 2:1 | Conc | 6.92 | 20.41 | 71.94 |
|  |  | Mid | 26.31 | 1.23 | 16.33 |
|  |  | Tail | 66.77 | 0.34 | 11.73 |
|  |  | Calculated head | | 1.96 | |
| A-2 | 1:1 | Conc | 3.83 | 27.72 | 57.35 |
|  |  | Mid | 21.27 | 1.63 | 18.76 |
|  |  | Tail | 74.90 | 0.59 | 23.89 |
|  |  | Calculated head | | 1.850 | |
| A-3 | 3:1 | Conc | 4.21 | 27.21 | 64.35 |
|  |  | Mid | 21.73 | 1.32 | 16.11 |
|  |  | Tail | 74.06 | 0.47 | 19.54 |
|  |  | Calculated head | | 1.781 | |

It will be obvious from the test work reported herein that mixtures of sodium chloride and calcium oxide are well suited for use as a chloridizing agent particularly in otherwise satisfactory chloridizing agent, is relatively expensive and places an undue cost on the treatment. Particularly the 2:1 mixture is a very good chloridizing agent and because of the high percentage of NaCl will be a cheap material in the locations where calcium chloride is expensive.

The practice of my invention as described herein affords sufficient variables in a control procedure to provide optimum conditions for the treatment of each type or ore amenable to the process. The final step of subjecting the sinter of the roast to magnetic separation does not involve any special procedure but the aforementioned test program has demonstrated that the sinter of my processing procedures is effectively treated by magnetic separation to obtain the final product of the treatment.

Testing also was undertaken to ascertain if concentration methods other than magnetic concentration are feasible. It was determined that a rather high percentage of concentration could be obtained by a heavy liquid separation. In this test, the ore was roasted with $$Ca(OH)_2 + NaCl + Coke$$

at 950° C. for an hour. The calcine was ground to pass 65 mesh and then separated in heavy liquid at 2.96 S.G. The following results were obtained:

|  | Percent Ni | Ni recovery |
|---|---|---|
| Heads | 1.36 | 100.00 |
| Tails | 0.08 | 2.75 |
| Concentrate | 2.48 | 97.25 |

Other treatment methods may be employed in the concentration step, such as tabling, froth flotation and other well-known ore dressing procedures.

I claim:

1. A process for recovering an upgraded nickel concentrate from nickeliferous laterite ores by segregated roasting, which comprises mixing a charge of such ore with a mixture of sodium chloride and calcium oxide as chloridizing agent and a carbonaceous reductant as feed to a roasting stage, the sodium chloride and calcium oxide being mixed in the approximate proportions of 2:1, heating the ore charge fed to roasting to temperatures in the range of 900° to 1050° C. while maintaining a slightly reducing atmosphere in the roasting stage, cooling in a nonoxidizing atmosphere, and collecting upgraded nickel as a concentrate of said roasting stage.

2. A process as defined in claim 1, in which the carbonaceous reductant is coal.

3. A process as defined in claim 1, in which the carbonaceous reductant is coke.

4. A process as defined in claim 1, in which the carbonaceous reductant is petroleum coke.

5. A process as defined in claim 1, in which the roasting temperature is maintained at about 950° C.

6. A process as defined in claim 1, in which the ore charge before mixing with the sodium chloride, calcium oxide and carbonaceous reductant is partially dried.

7. A process for recovering an upgraded nickel concentrate from nickeliferous laterite ores by segregated roasting, which comprises mixing a charge of such ore with a mixture of sodium chloride and calcium oxide in the approximate proportions of 2:1 as chloridizing agent and a carbonaceous reductant as feed to a roasting stage, heating the ore charge fed to roasting to temperatures in the range of 900° C. to 1050° C. while maintaining a slightly reducing atmosphere in the roasting stage, cooling in a nonoxidizing atmosphere, reducing the sinter of roasting to a finely divided condition, subjecting the finely divided material to a magnetic separation, and collecting upgraded nickel as a concentrate of the magnetic separation.

8. A process as defined in claim 7, in which size reduction produces a feed product of about minus 35 mesh for magnetic separation.

9. A process as defined in claim 7, in which the ore charge before mixing with the sodium chloride, calcium oxide and carbonaceous reductant is partially dried.

10. A process for recovering an upgraded nickel concentrate from nickeliferous laterite ores by segregated roasting, which comprises mixing a charge of such ore with a mixture of sodium chloride and calcium oxide in the approximate proportions of 2:1 as chloridizing agent and a carbonaceous reductant as feed to a roasting stage, heating the ore charge fed to roasting to temperatures in the range of 900° C. to 1050° C. while maintaining a slightly reducing atmosphere in the roasting stage, cooling in a nonoxidizing atmosphere, reducing the sinter of roasting to a finely divided condition, subjecting the finely divided material to a heavy media separation, and collecting upgraded nickel as a concentrate of the heavy media separation.

11. A process as defined in claim 10, in which the ore charge before mixing with the sodium chloride, calcium oxide and carbonaceous reductant is partially dried.

References Cited

UNITED STATES PATENTS

| 3,453,101 | 7/1969 | Takahashi et al. | 75—82 X |
| 1,593,022 | 7/1926 | Knight | 75—113 |
| 3,466,169 | 9/1969 | Nowak et al. | 75—113 X |

ALLEN B. CURTIS, Primary Examiner

U.S. Cl. X.R.

75—82, 113